(12) United States Patent
Tsai et al.

(10) Patent No.: US 12,418,787 B2
(45) Date of Patent: Sep. 16, 2025

(54) APPARATUSES AND METHODS FOR SIMULTANEOUS RECEPTION OR TRANSMISSION ASSOCIATED WITH DUAL SUBSCRIBER NUMBERS USING A SINGLE RADIO FREQUENCY (RF) DEVICE

(71) Applicant: MEDIATEK INC., Hsinchu (TW)

(72) Inventors: Chih-Yuan Tsai, Hsinchu (TW); Chao-Chih Chang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 400 days.

(21) Appl. No.: 17/557,267

(22) Filed: Dec. 21, 2021

(65) Prior Publication Data

US 2022/0417730 A1 Dec. 29, 2022

Related U.S. Application Data

(60) Provisional application No. 63/215,567, filed on Jun. 28, 2021.

(51) Int. Cl.
*H04W 8/22* (2009.01)
(52) U.S. Cl.
CPC .................................... *H04W 8/22* (2013.01)
(58) Field of Classification Search
CPC ....................................................... H04W 8/22
See application file for complete search history.

(56) References Cited

U.S. PATENT DOCUMENTS

| | | | |
|---|---|---|---|
| 2016/0095087 A1* | 3/2016 | Mohseni | H04W 24/08 455/558 |
| 2016/0242181 A1* | 8/2016 | Ponukumati | H04L 5/001 |
| 2017/0127217 A1 | 5/2017 | Miao et al. | |
| 2018/0077728 A1* | 3/2018 | Shi | H04W 74/0833 |
| 2018/0249349 A1* | 8/2018 | Hu | H04W 88/06 |
| 2020/0351638 A1* | 11/2020 | Kim | H04W 8/005 |
| 2021/0014667 A1* | 1/2021 | Lovlekar | H04W 12/72 |
| 2021/0076355 A1* | 3/2021 | Ballakur | H04W 72/1273 |
| 2021/0120524 A1* | 4/2021 | Palle | H04W 68/005 |

(Continued)

OTHER PUBLICATIONS

Chinese language office action dated 2022-06-09, issued in application No. TW 110147814.

(Continued)

*Primary Examiner* — Congvan Tran
(74) *Attorney, Agent, or Firm* — McClure, Qualey & Rodack, LLP

(57) ABSTRACT

A method for simultaneous Reception (Rx) or Transmission (Tx) associated with dual subscriber numbers using a single RF device in a User Equipment (UE) is provided. The UE determines whether a trigger condition for enabling simultaneous Rx or Tx operation associated with two separate subscriber numbers is met. In response to the trigger condition being met, the UE reports a first value representing an aggregated bandwidth or a number of CCs or MIMO layers for one of the two separate subscriber numbers to a mobile communication network via the single RF device, so as to enable simultaneous Rx or Tx operation associated with the two separate subscriber numbers. In particular, the first value is less than a second value representing a maximum aggregated bandwidth or a maximum number of CCs or MIMO layers supported by the UE's capability.

20 Claims, 7 Drawing Sheets

(56) References Cited

U.S. PATENT DOCUMENTS

| | | | |
|---|---|---|---|
| 2021/0212155 A1* | 7/2021 | Huang-Fu | H04W 76/27 |
| 2021/0250828 A1* | 8/2021 | Vaidya | H04W 24/08 |
| 2021/0400626 A1* | 12/2021 | Yerramalli | H04L 5/0048 |
| 2022/0394605 A1* | 12/2022 | Wang | H04W 48/18 |
| 2023/0026600 A1* | 1/2023 | Xie | H04W 56/001 |
| 2023/0047213 A1* | 2/2023 | Chen | H04W 68/02 |
| 2023/0075568 A1* | 3/2023 | Kanneath Abraham | H04W 24/10 |
| 2023/0199578 A1* | 6/2023 | Wu | H04W 36/362 370/331 |

OTHER PUBLICATIONS

3rd Generation Partnership Project; "3GPP TR 23.761 V17.0.0;" 3rd Generation Partnership Project; Technical Specification Group Services and System Aspects; Study on system enablers for devices having multiple Universal Subscriber Identity Modules (USIM) (Release 17); Jun. 2021; pp. 1-108.

* cited by examiner

APPARATUSES AND METHODS FOR SIMULTANEOUS RECEPTION OR TRANSMISSION ASSOCIATED WITH DUAL SUBSCRIBER NUMBERS USING A SINGLE RADIO FREQUENCY (RF) DEVICE

CROSS REFERENCE TO RELATED APPLICATIONS

This application claims priority under 35 U.S.C. § 119 from U.S. Provisional Application No. 63/215,567, entitled "Enable dual receive capability method", filed on Jun. 28, 2021, the subject matter of which is incorporated herein by reference.

BACKGROUND OF THE APPLICATION

Field of the Application

The application generally relates to mobile communications and, more particularly, to apparatuses and methods for simultaneous reception or transmission associated with dual subscriber numbers using a single Radio Frequency (RF) device.

Description of the Related Art

In a typical mobile communication environment, a User Equipment (UE) (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and New Radio (NR) technology etc. In particular, GSM/GPRS/EDGE technology is also called 2G technology; WCDMA/CDMA-2000/TD-SCDMA technology is also called 3G technology; LTE/LTE-A/TD-LTE technology is also called 4G technology; and NR technology is also called 5G technology.

Generally, a cell phone only supports one RAT and provides the user with flexible mobile communications at all times via the supported RAT using a single subscriber number. However, to an increasing extent, more and more people find that having an additional subscriber number is a good way to reduce their mobile service charges (including voice and/or data services), or to separate personal and business phone calls. In order to alleviate the burden of carrying two cell phones for two separate subscriber numbers, so-called dual-Subscriber Identity Module (SIM) cell phones have been developed, which support one or more RATs for respective mobile services using an individual subscriber number. To keep manufacturing costs low, most dual-SIM cell phones are equipped with a single Radio Frequency (RF) device.

In most conventional designs of a dual-SIM cell phone, only one subscriber number is allowed to occupy the single RF device for transmission/reception operation at any given time, due to the single RF device being shared by the transmission/reception operation associated with two separate subscriber numbers. For instance, if a call request for SIM1 is received during an ongoing data service associated with SIM2, the data service associated with SIM2 will be stopped to give away the access to the RF device, so that the call associated with SIM1 may be made. That being said, the disadvantage of sharing a single RF may be overcome by new features supported in more advanced RATs. In one example, a technique called Multiple-Input-Multiple-Output (MIMO) is supported in 4G/5G systems, which is used to increase the data throughput by using multiple transmitter antenna and multiple receiver antenna, e.g., of a single RF device. Generally speaking, MIMO may be referred to as the ability to transmit multiple data streams (or called "layers"), using the same time and frequency resource, where each data stream may be beamformed, and these data streams may be shared by the reception (Rx) or transmission (Tx) operation associated with two separate subscriber numbers.

However, according to the 3rd Generation Partnership Project (3GPP) specifications in compliance with the 4G/5G technology, the number of MIMO layers that a UE operates with is configured by the network. As a result, a dual-SIM UE may be configured with the number of maximum MIMO layers for one SIM, causing the other SIM to be unable to obtain antenna access for Rx/Tx operation.

Therefore, it is desirable to have a robust way for a dual-SIM UE with a single RF device to enable simultaneous Rx/Tx operation associated with two separate subscriber numbers.

BRIEF SUMMARY OF THE APPLICATION

The present application proposes a robust way for a dual-SIM UE with a single RF device to enable simultaneous Rx/Tx operation associated with two separate subscriber numbers, by allowing the UE to report a reduced aggregated bandwidth or a reduced number of Component Carriers (CCs) or Multiple-Input-Multiple-Output (MIMO) layers for one subscriber number to the network when the trigger condition is met. In response to the report, the network may configure the UE to reduce the aggregated bandwidth or the number of CCs or MIMO layers for one subscriber number, so that the UE's capability regarding aggregated bandwidth, CC(s), or MIMO layer(s)) may be available to the other subscriber number.

In one aspect of the application, a UE comprising a single RF device and a controller is provided. The controller is configured to determine whether a trigger condition for enabling simultaneous Rx or Tx operation associated with two separate subscriber numbers is met, and in response to the trigger condition being met, report a first value representing an aggregated bandwidth or a number of CCs or MIMO layers for one of the two separate subscriber numbers to a mobile communication network via the single RF device, so as to enable simultaneous Rx or Tx operation associated with the two separate subscriber numbers, wherein the first value is less than a second value representing a maximum aggregated bandwidth or a maximum number of CCs or MIMO layers supported by the UE's capability.

In another aspect of the application, a method is provided. The method comprises the following steps: determining, by a UE, whether a trigger condition for enabling simultaneous Rx or Tx operation associated with two separate subscriber numbers is met; and in response to the trigger condition being met, reporting, by the UE, a first value representing an aggregated bandwidth or a number of CCs or MIMO layers for one of the two separate subscriber numbers to a mobile communication network via the single RF device, so as to enable simultaneous Rx or Tx operation associated with the two separate subscriber numbers, wherein the first value is less than a second value representing a maximum aggregated bandwidth or a maximum number of CCs or MIMO layers supported by the UE's capability.

In one example, the trigger condition comprises: (1) the UE is using the one of the two separate subscriber numbers to operate in a connected mode of communication with the mobile communication network; and (2) current configuration of Radio Access Technologies (RATs) and band combinations in use for the two separate subscriber numbers does not support simultaneous Rx or Tx operation associated with the two separate subscriber numbers.

In one example, the one of the two separate subscriber numbers is configured for use of data services.

In one example, the first value is reported in a UE Assistance Information message. The UE Assistance Information message is a Radio Resource Control (RRC) message, and the first value is reported without interrupting any ongoing data session of the UE. After reporting the first value, the UE receives a Downlink Control Information (DCI) comprising an indication to reduce an aggregated bandwidth or a number of MIMO layers, or a Media Access Control (MAC) Control Element (CE) comprising an indication to reduce a number of CCs, and reduces the aggregated bandwidth or the number of CCs or MIMO layers for the one of the two separate subscriber numbers according to the indication.

In one example, the first value is reported in an Attach Request message, a Tracking Area Update Request message, or a Registration Request message. Prior to reporting the first value, the UE uses the one of the two separate subscriber numbers to switch from the connected mode to an idle mode of communication with the mobile communication network, and receives configuration of reducing an aggregated bandwidth or a number of CCs or MIMO layers from the mobile communication network after reporting the first value. The UE reduces the aggregated bandwidth or the number of CCs or MIMO layers for the one of the two separate subscriber numbers according to the received configuration.

In one example, after reporting the first value, the UE determines whether it is using the one of the two separate subscriber numbers to operate in an idle mode of communication with the mobile communication network. In response to using the one of the two separate subscriber numbers to operate in the idle mode, the UE reports a third value representing an aggregated bandwidth or a number of CCs or MIMO layers that the UE operated with before reporting the first value.

In one example, after reporting the first value, the UE monitors whether current configuration of RATs and band combinations in use for the two separate subscriber numbers is supported by network in the UE's current location. In response to the current configuration of RATs and band combinations in use for the two separate subscriber numbers not being supported by network in the UE's current location, the UE reports a third value representing an aggregated bandwidth or a number of CCs or MIMO layers that the UE operated with before reporting the first value.

Other aspects and features of the present application will become apparent to those with ordinarily skill in the art upon review of the following descriptions of specific embodiments of the UEs and methods for simultaneous reception or transmission associated with dual subscriber numbers using a single RF device.

BRIEF DESCRIPTION OF THE DRAWINGS

The present application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Figure 1:
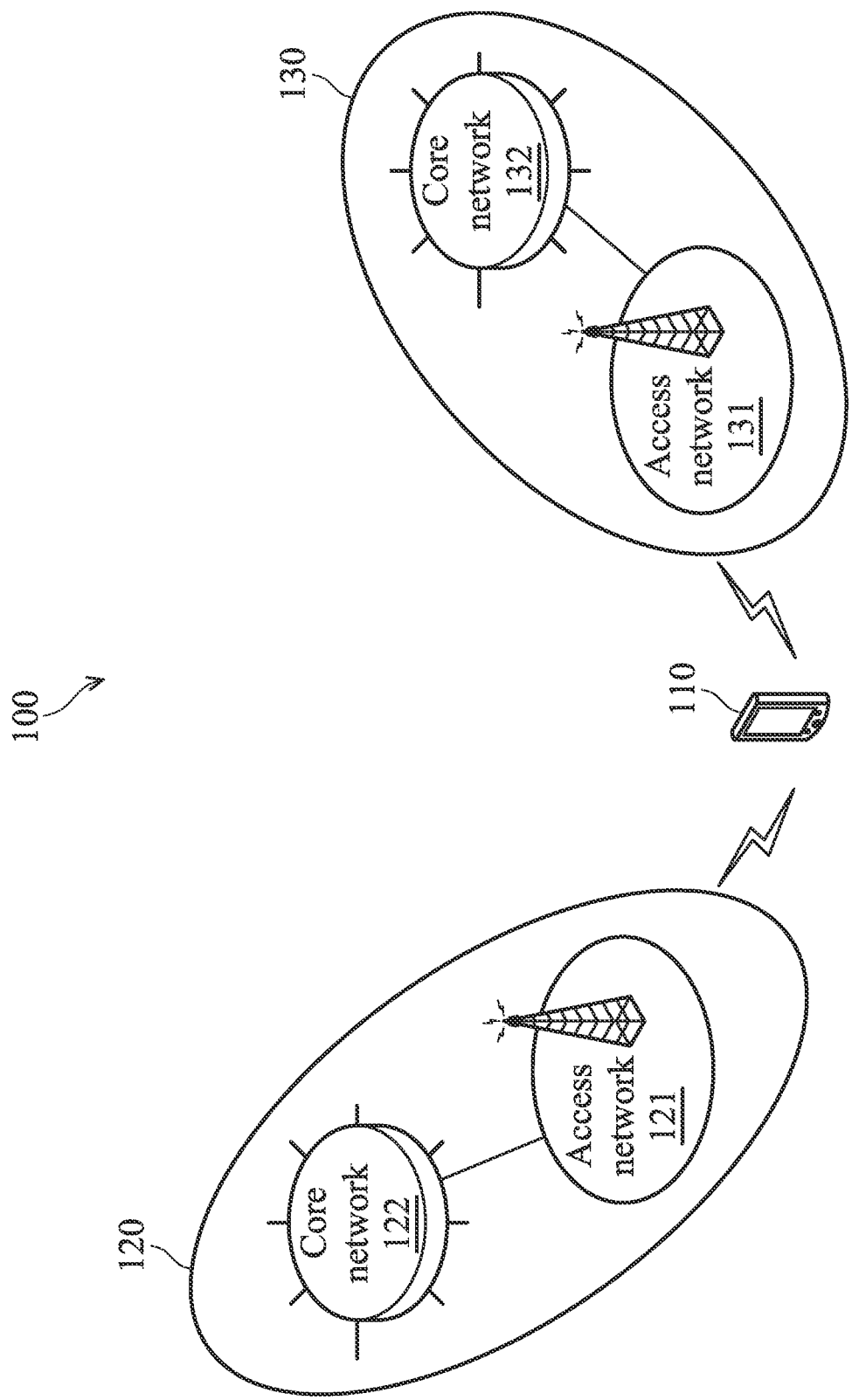
FIG. 1 is a block diagram of a mobile communication environment according to an embodiment of the application.

FIG. 1 is a block diagram of a mobile communication environment according to an embodiment of the application.

As shown in FIG. 1, the mobile communication environment 100 includes a UE 110 and two mobile communication networks 120 and 130.

The UE 110 may be a feature phone, a smartphone, a panel Personal Computer (PC), a laptop computer, a Machine Type Communication (MTC) device, or any mobile communication device supporting the RATs utilized by the mobile communication networks 120 and 130.

The UE 110 may wirelessly communicate with one or both of the mobile communication networks 120 and 130 using two separate subscriber numbers. The subscriber numbers may be provided by one or two subscriber identity cards (not shown) in compliance with the specifications of the RAT utilized by the mobile communication networks 120 and 130. For example, the subscriber identity cards may include a Subscriber Identity Module (SIM) card if one of the mobile communication networks 120 and 130 is a GSM/GPRS/EDGE/IS-95 network, or may include a Universal SIM (USIM) card if one of the mobile communication networks 120 and 130 is a WCDMA/LTE/LTE-A/TD-LTE/NR network. Alternatively, the subscriber numbers may be directly written into the UE 110, without the need for any socket to insert any subscriber identity card, or the subscriber numbers may be provided by one or more virtual subscriber identity cards (e.g., eSIM/eUSIM), and the present application is not limited thereto.

To be more specific, the UE 110 is equipped with a single RF device. That is, the single RF device is shared by the Rx/Tx operation associated with the two separate subscriber numbers.

The mobile communication network 120 includes an access network 121 and a core network 122, and the mobile communication network 130 includes an access network 131 and a core network 132. The access networks 121 and 131 are responsible for processing radio signals, terminating radio protocols, and connecting the UE 110 with the core networks 122 and 132, respectively. The core networks 122 and 132 are responsible for performing mobility management, network-side authentication, and interfaces with public/external networks (e.g., the Internet).

The access networks 121 and 131 and the core networks 122 and 132 may each include one or more network nodes for carrying out said functions. For example, if the mobile communication network 120 or 130 is a 4G network (e.g., an LTE/LTE-A/TD-LTE network), the access network 121 or 131 may be an Evolved-Universal Terrestrial Radio Access Network (E-UTRAN) which includes at least an evolved NB (eNB) (e.g., a macro eNB, femto eNB, or pico eNB), and the core network 122 or 132 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

If the mobile communication network 120 or 130 is a 5G network (e.g., an NR network), the access network 121 or 131 may be a Next Generation Radio Access Network (NG-RAN) which includes at least a gNB or Transmission Reception Point (TRP), and the core network 122 or 132 may be a Next Generation Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

In one embodiment, the mobile communication network 130 (e.g., a 5G network) may be deployed in the Non-Standalone (NSA) architecture which depends on the control plane of the mobile communication network 120 (e.g., a 4G network) for control functions, while the mobile communication network 130 is exclusively focused on user plane. The NSA architecture may support the feature of Evolved-Universal Terrestrial Radio Access (E-UTRA)-NR Dual Connectivity (EN-DC), NR-EUTRA Dual Connectivity (NE-DC), or Next Generation EN-DC (NGEN-DC), which allows the UE 110 to be able to have dual connectivity with both the mobile communication networks 120 and 130 simultaneously.

Although not shown, the mobile communication networks 120 and 130 may support interworking with specific communication interface(s). For example, there may be an interface connecting the NG-RAN of an NR network (e.g., the mobile communication network 130) to the EPC of an LTE network (e.g., the mobile communication network 120), or an interface connecting the E-UTRAN of an LTE network (e.g., the mobile communication network 120) to the NG-CN of an NR network (e.g., the mobile communication network 130), or an interface connecting the E-UTRAN of an LTE network (e.g., the mobile communication network 120) to the NG-RAN of an NR network (e.g., the mobile communication network 130).

In accordance with one novel aspect, the UE 110 is capable of detecting whether the trigger condition for enabling simultaneous Rx/Tx operation associated with two separate subscriber numbers is met. Moreover, when the trigger condition is met, the UE 110 may enable simultaneous Rx/Tx operation associated with two separate subscriber numbers, by reporting a reduced aggregated bandwidth or a reduced number of CCs or MIMO layers for a first subscriber number (e.g., provided by a data SIM/USIM (i.e., a SIM/USIM configured for using data services)) to the mobile communication network 120/130, to allow the mobile communication network 120/130 to reduce the aggregated bandwidth or the number of CCs or MIMO layers that the UE 110 operates with for the first subscriber number.

It should be understood that mobile communication environment 100 is for illustrative purposes only and is not intended to limit the scope of the application. For example, the present application may be applied to other RATs, as long as the UE 110 supports dual connectivity over the RATs utilized by the mobile communication networks 120 and 130.

Figure 2:
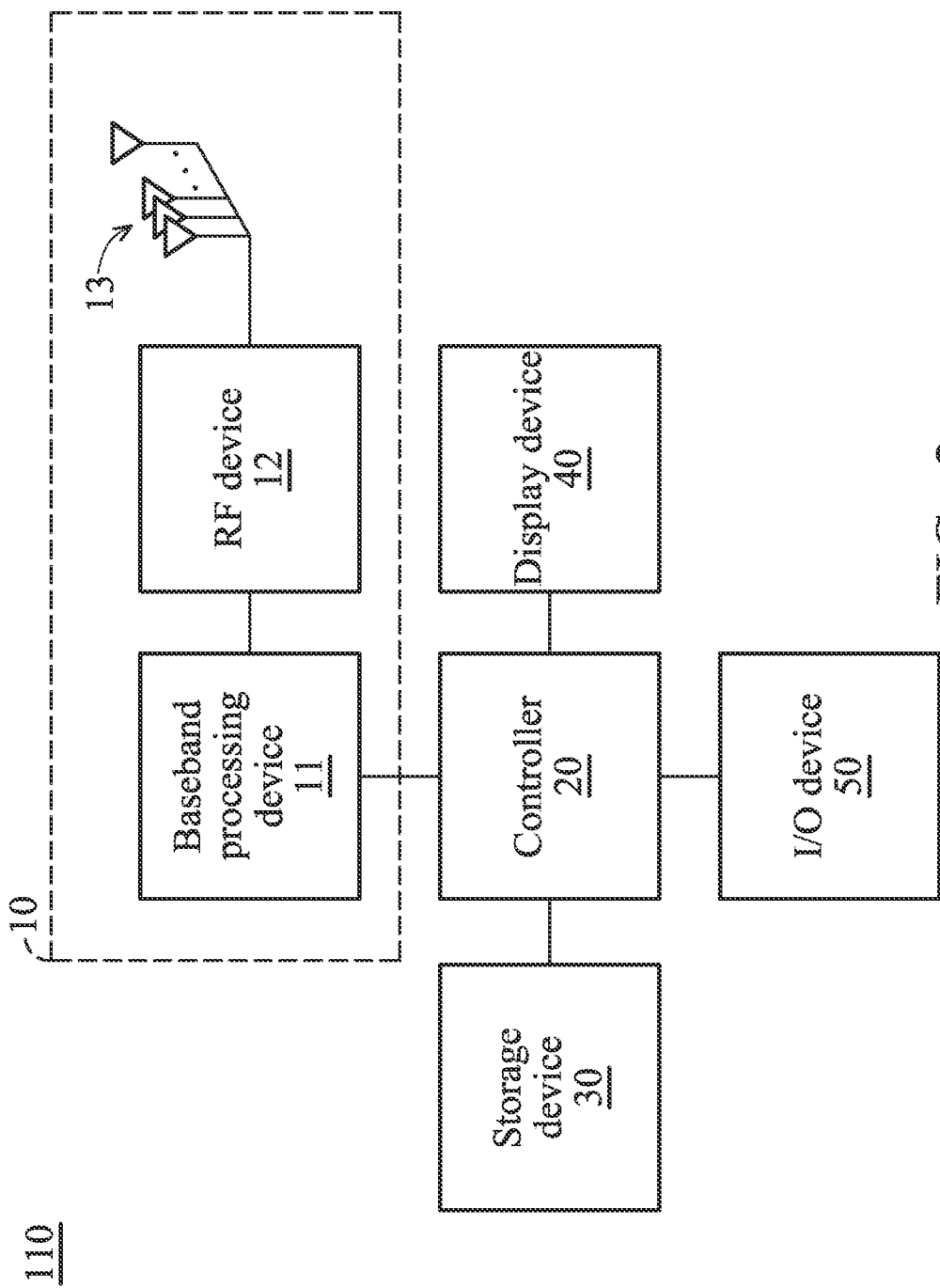
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include a wireless transceiver 10, a controller 20, a storage device 30, a display device 40, and an Input/Output (I/O) device 50.

The wireless transceiver 10 is configured to perform wireless transmission and reception to and from the mobile communication network 120/130. Specifically, the wireless transceiver 10 may include a baseband processing device 11, a Radio Frequency (RF) device 12, and antenna 13, wherein the antenna 13 may include an antenna array for beamforming.

The baseband processing device 11 (or called baseband modem) is configured to perform baseband signal processing and control the communications between subscriber identity card(s) (e.g., one or more SIMs/USIMs) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported RATs, wherein the radio frequency may be 900 MHz, 2100 MHz, or 2.6 GHz utilized in 4G (e.g., LTE/LTE-A/TD-LTE) systems, or may be any radio frequency (e.g., 30 GHz-300 GHz for mmWave, or 3.3 GHz-4.9 GHz for sub-6) utilized in 5G (e.g., NR) systems, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless transceiving with the mobile communication network 120/130, enabling the storage device 30 for storing and retrieving data, sending a series of frame data (e.g. representing text messages, graphics, images, etc.) to the display device 40, and receiving/outputting signals from/to the I/O device 50.

In particular, the controller 20 coordinates the aforementioned operations of the wireless transceiver 10, the storage device 30, the display device 40, and the I/O device 50 for performing the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory computer-readable storage medium, including one or more Universal Integrated Circuit Cards (UICCs) (e.g., SIM/USIM cards), a memory (e.g., a FLASH memory or a Non-Volatile Random Access Memory (NVRAM)), a magnetic storage device (e.g., a hard disk or a magnetic tape), or an optical disc, or any combination thereof for storing data, instructions, and/or program code of applications, communication protocols, and/or the method of the present application. In one example, the method of the present application may be implemented as part of a communication protocol, such as a 4G LTE or 5G NR protocol stack, which may include a Non-Access-Stratum (NAS) layer, a Radio Resource Control (RRC) layer for high layer configuration and control, a Packet Data Convergence Protocol/Radio Link Control (PDCP/RLC) layer, a Media Access Control (MAC) layer, and a Physical (PHY) layer. In one example, the instructions or program code implementing the protocol stack may be stored in a memory within the baseband processing device 11.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

It should be understood that the components described in the embodiment of FIG. 2 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications. Alternatively, the UE 110 may include fewer components. For example, the UE 110 may not include the display device 40 and/or the I/O device 50.

Figure 3:
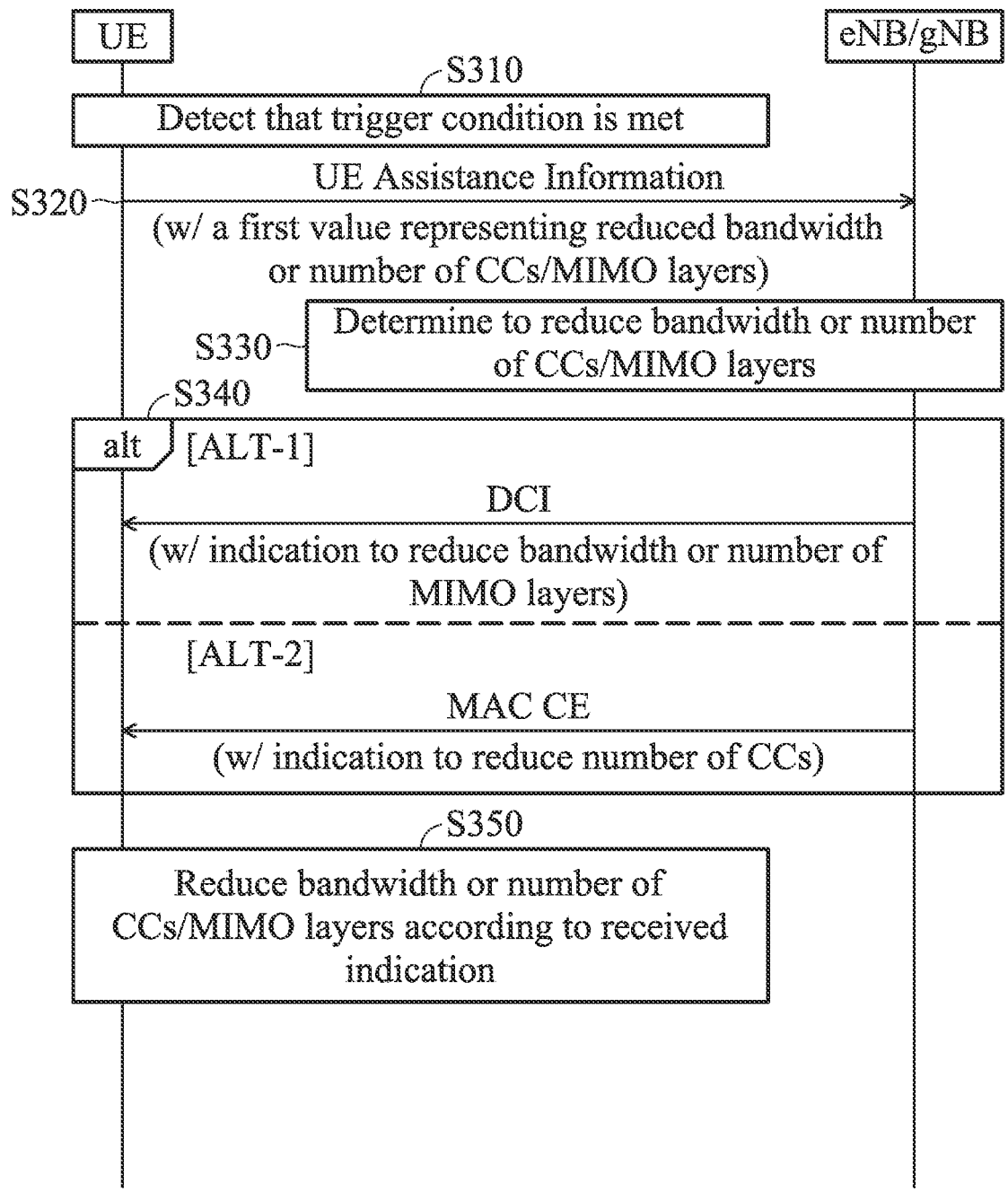
FIG. 3 is a message sequence chart illustrating the enabling of simultaneous Rx/Tx operation associated with two separate subscriber numbers according to an embodiment of the application.

FIG. 3 is a message sequence chart illustrating the enabling of simultaneous Rx/Tx operation associated with two separate subscriber numbers according to an embodiment of the application.

In step S310, the UE detects that the trigger condition for enabling simultaneous Rx/Tx operation associated with two separate subscriber numbers is met.

In one example, the trigger condition may include the following: (1) the UE 110 is using the first subscriber number (e.g., provided by a SIM/USIM configured for using data services (or called a data SIM/USIM)) to operate in a connected mode (e.g., the RRC_CONNECTED mode) of communication with the eNB/gNB; and (2) the current configuration of RATs and (frequency) band combinations in use for the two separate subscriber numbers do not support simultaneous Rx/Tx operation associated with the two separate subscriber numbers.

In step S320, the UE sends a UE Assistance Information message including a first value representing the aggregated bandwidth or the number of CCs or MIMO layers for the first subscriber number to the eNB/gNB. Specifically, the first value is less than a second value representing the maximum aggregated bandwidth or the maximum number of CCs or MIMO layers supported by the UE's capability. Optionally, the first value may be less than a third value representing the aggregated bandwidth or the number of CCs or MIMO layers that the UE currently operates with using the first subscriber number. That is, the first value represents a reduced aggregated bandwidth or a reduced number of CCs or MIMO layer.

In step S330, the eNB/gNB determines to reduce the aggregated bandwidth or the number of CCs or MIMO layers that the UE operates with using the first subscriber number, in response to the first value received in the UE Assistance Information message.

In step S340, the eNB/gNB sends a Downlink Control Information (DCI) with an indication to reduce the aggregated bandwidth or the number of MIMO layers (denoted as ALT-1 in FIG. 3), or sends a Media Access Control (MAC) Control Element (CE) with an indication to reduce the number of CCs to the UE (denoted as ALT-2 in FIG. 3).

In one embodiment, the DCI may be a UE-specific DCI with a DCI format 0_0/0_1/1_0/1_1 in a 5G network. In another embodiment, the DCI may be a UE-specific DCI with a DCI format 1/1A/1B/1C/1D/2/2A in a 4G network. For example, the DCI may be a DCI format 1_1 including a field called "Antenna port(s) and number of layers" for configuration of the MIMO functionality, and thus, the indication can be understood as an indication to reduce the number of MIMO layers to 1 if this field is set to value 0/1/3/4/5/6 for Single-Input-Single-Output (SISO), or can be understood as an indication to reduce the number of MIMO layers to 2 if this field is set to value 2/7/8/11, or can be understood as an indication to reduce the number of MIMO layers to 3 if this field is set to value 9. For example, the DCI may be a DCI format 0_1/1_1 including a field called "Bandwidth part indicator" for configuration of the aggregated bandwidth, and thus, the indication can be understood as an indication to reduce the aggregated bandwidth.

In step S350, the UE reduces the aggregated bandwidth, or the number of CCs or MIMO layers for the first subscriber number according to the received indication, to enable simultaneous Rx/Tx operation associated with two separate subscriber numbers.

Figure 4:
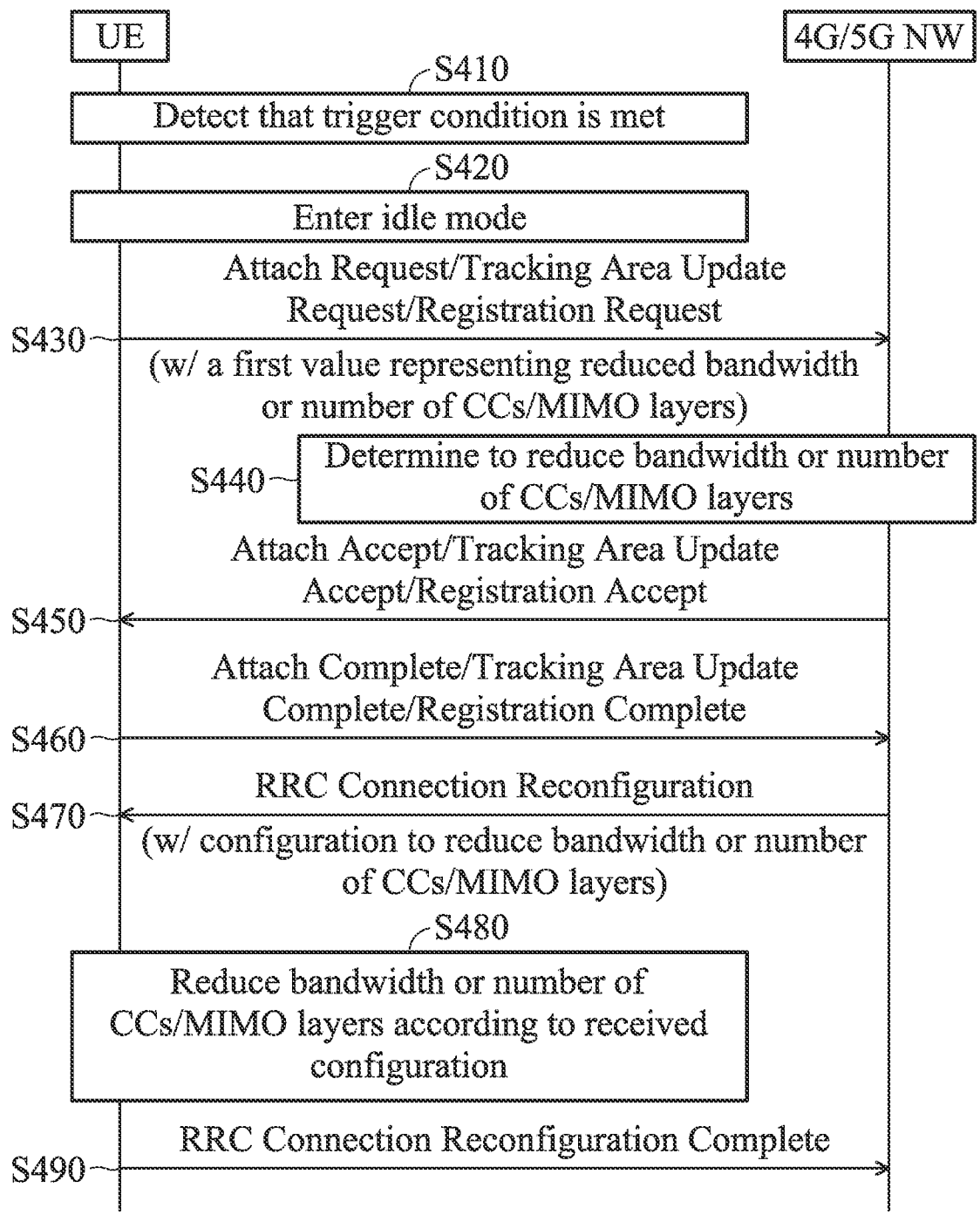
FIG. 4 is a message sequence chart illustrating the enabling of simultaneous Rx/Tx operation associated with two separate subscriber numbers according to an embodiment of the application.

FIG. 4 is a message sequence chart illustrating the enabling of simultaneous Rx/Tx operation associated with two separate subscriber numbers according to an embodiment of the application.

In step S410, the UE detects that the trigger condition for enabling simultaneous Rx/Tx operation associated with two separate subscriber numbers is met.

The trigger condition is the same as that described in step S310 in the embodiment of FIG. 3. That is, the UE is using the first subscriber number to operate in a connected mode (e.g., RRC_CONNECTED mode) of communication with the eNB/gNB of a 4G/5G network, and the current configuration of RATs and (frequency) band combinations in use for the two separate subscriber numbers do not support simultaneous Rx/Tx operation associated with the two separate subscriber numbers.

In step S420, the UE uses the first subscriber number to switch from the connected mode to an idle mode (e.g., the RRC IDLE mode) of communication with the 4G/5G network.

In step S430, the UE sends an Attach Request message, a Tracking Area Update Request message, or a Registration Request message including a first value representing the aggregated bandwidth or the number of CCs or MIMO layers for the first subscriber number to the 4G/5G network (e.g., the eNB/gNB or the MME/AMF of the 4G/5G network). Specifically, the first value is less than a second value representing a maximum aggregated bandwidth or the maximum number of CCs or MIMO layers supported by the UE's capability.

In step S440, the 4G/5G network determines to reduce the aggregated bandwidth or the number of CCs or MIMO layers that the UE operates with for the first subscriber number, in response to the first value received in the Attach Request message, the Tracking Area Update Request message, or the Registration Request message.

In step S450, the 4G/5G network replies to the UE with an Attach Accept message, a Tracking Area Update Accept message, or a Registration Accept message.

In step S460, the UE sends an Attach Complete message, a Tracking Area Update Complete message, or a Registration Complete message to the 4G/5G network, to acknowledge the reception of the Attach Accept message, the Tracking Area Update Accept message, or the Registration Accept message.

In step S470, the 4G/5G network sends an RRC Connection Reconfiguration message with the configuration of reducing the aggregated bandwidth or the number of CCs or MIMO layers to the UE.

In step S480, the UE reduces the aggregated bandwidth or the number of CCs or MIMO layers according to the received configuration, to enable simultaneous Rx/Tx operation associated with two separate subscriber numbers.

In step S490, the UE sends an RRC Connection Reconfiguration Complete message to the 4G/5G network.

It should be appreciated that in the embodiment of FIG. 3, the signaling procedure used to report the reduced bandwidth or reduced number of CCs or MIMO layers involves only RRC layer signaling (i.e., the UE Assistance Information message is an RRC message), and thus, the reporting can be performed without interrupting any ongoing data session of the UE. By contrast, in the embodiment of FIG. 4, the signaling procedure used to report the reduced bandwidth or reduced number of CCs or MIMO layers may involve Non-Access Stratum (NAS) layer signaling which would be less cost effective when compared to RRC layer signaling, and the UE is forced to enter the idle mode before the reporting can take place, which will inevitably cause interruption to the ongoing data session(s) of the UE.

Figure 5A:
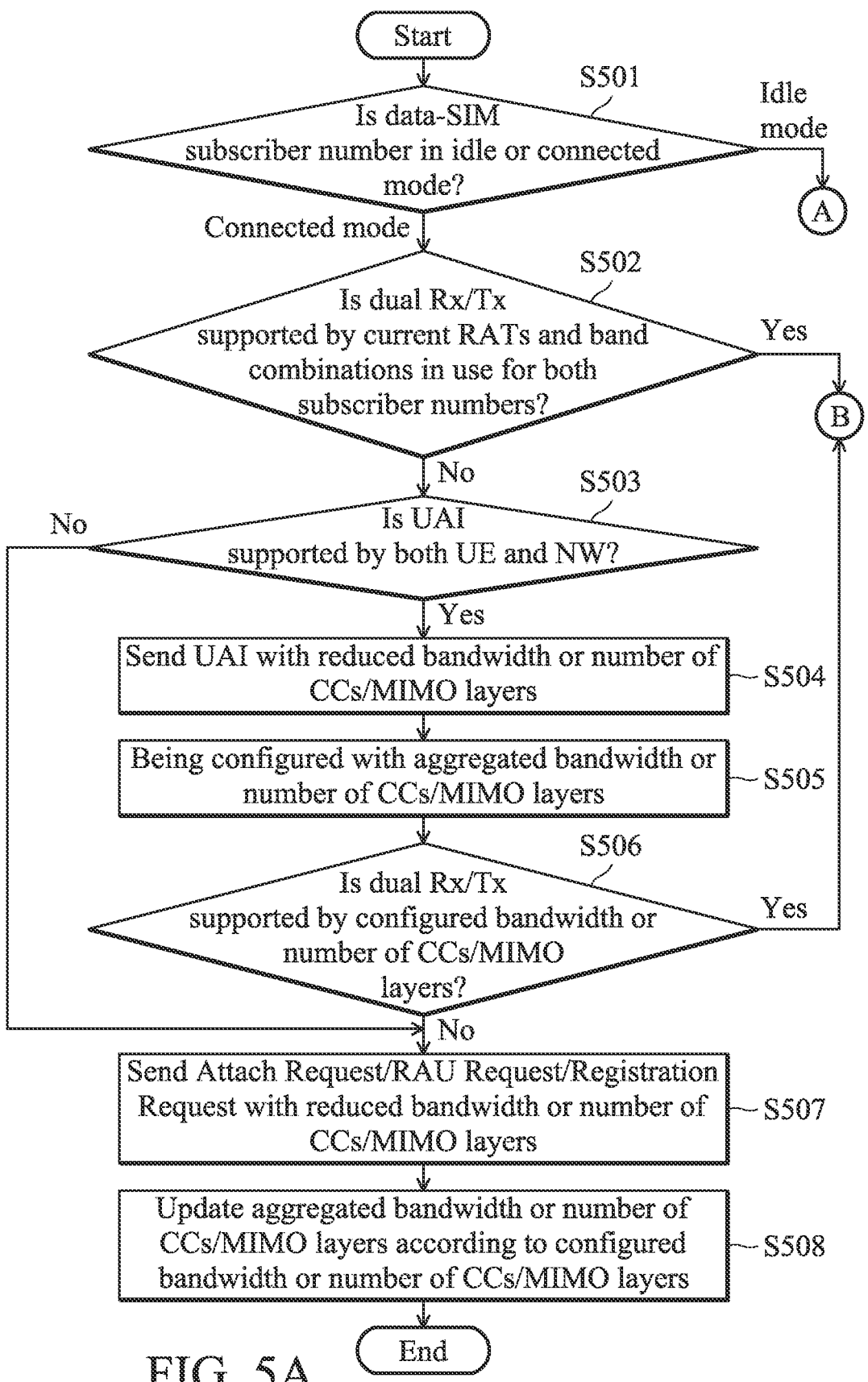
FIGS. 5A-5C depict a flow chart illustrating the method for simultaneous reception or transmission associated with dual subscriber numbers using a single RF device according to an embodiment of the application.
Figure 5B:
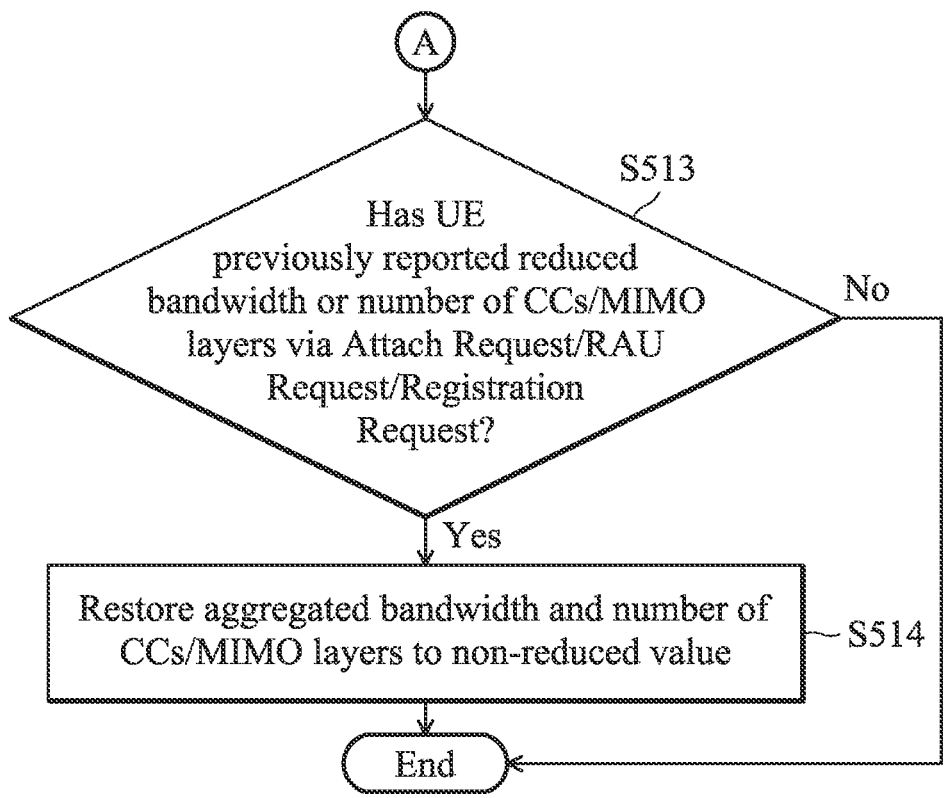
Figure 5C:
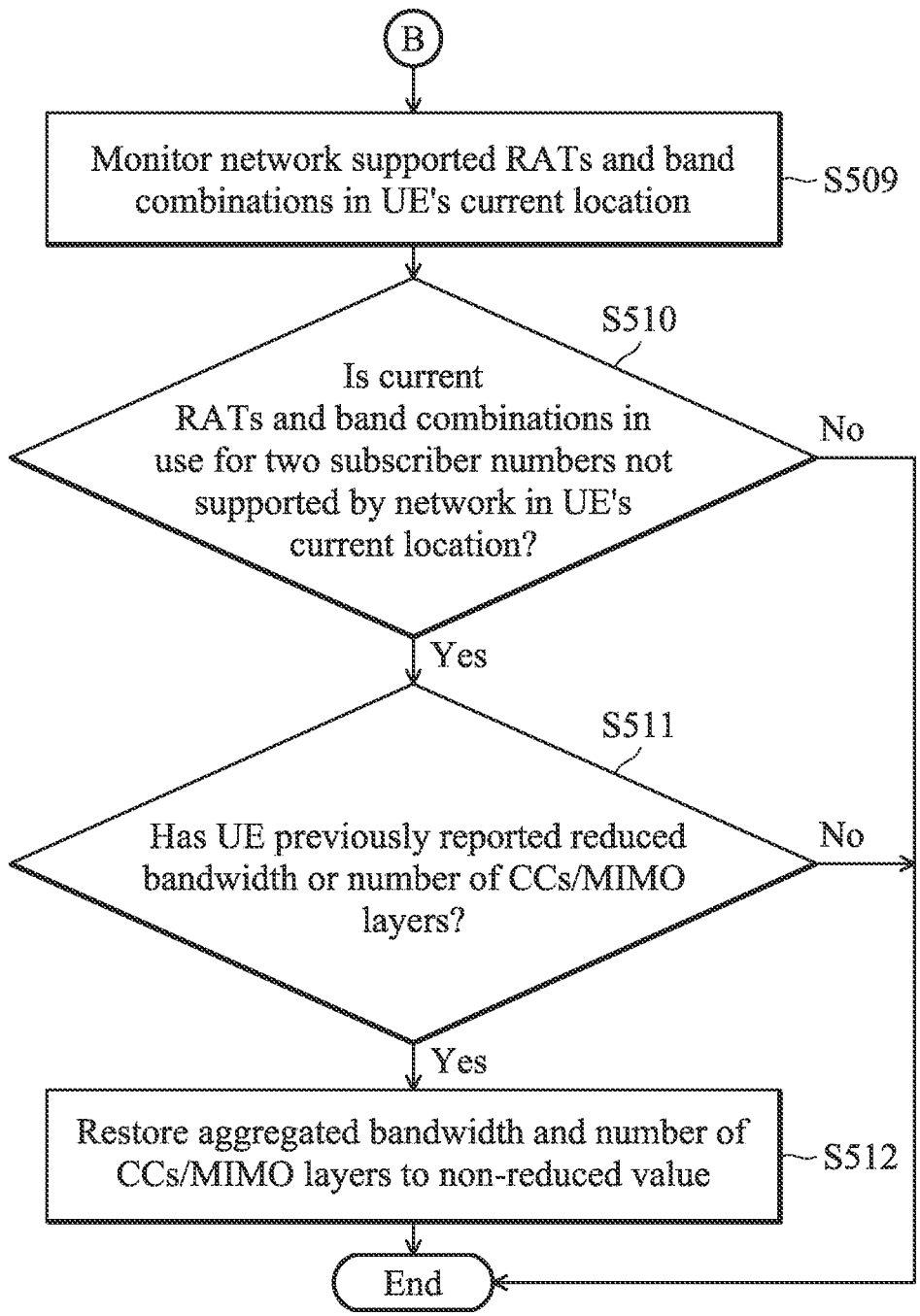

FIGS. 5A-5C depict a flow chart illustrating the method for simultaneous reception or transmission associated with dual subscriber numbers using a single RF device according to an embodiment of the application.

In this embodiment, the method is applied to and executed by a UE (e.g., the UE 110) communicatively connected to a mobile communication network (e.g., the mobile communication network 120/130).

In step S501, the UE determines whether the state of the data-SIM subscriber number (i.e., a subscriber number provided by a SIM/USIM configured for using data services) is in the connected mode or the idle mode. In one example, the two separate subscriber numbers may consist of a data-SIM subscriber number and a non-data-SIM subscriber number. In another example, the two separate subscriber numbers may consist of two data-SIM subscriber numbers (e.g., designated for the uses of different APPs), and one of them is the concerned data-SIM subscriber number.

Subsequent to step S501, if the state of the data-SIM subscriber number is in the connected mode, the method proceeds to step S502.

In step S502, the UE determines whether the current configuration of RATs and band combinations in use for the two separate subscriber numbers supports simultaneous Rx/Tx operation associated with the two separate subscriber numbers (denoted as "dual Rx/Tx" in FIG. 5A for brevity).

Subsequent to step S502, if the current configuration of RATs and band combinations in use for the two separate subscriber numbers do not support simultaneous Rx/Tx operation associated with the two separate subscriber numbers, the method proceeds to step S503.

In step S503, the UE determines whether the UE Assistance Information message (denoted as "UAI" in FIG. 5A for brevity) is supported by both the UE and the mobile communication network.

Subsequent to step S503, if the UE Assistance Information message is supported by both the UE and the mobile communication network, the method proceeds to step S504. Otherwise, if the UE Assistance Information message is not supported by both the UE and the mobile communication network, the method proceeds to step S507.

In step S504, the UE sends a UE Assistance Information message including a first value representing the aggregated bandwidth or the number of CCs or MIMO layers for the data-SIM subscriber number to the mobile communication network. Specifically, the first value is less than a second value representing the maximum aggregated bandwidth or the maximum number of CCs or MIMO layers supported by the UE's capability. Optionally, the first value may be less than a third value representing the aggregated bandwidth or the number of CCs or MIMO layers that the UE currently operates with using the data-SIM subscriber number. That is, the first value represents a reduced aggregated bandwidth or a reduced number of CCs or MIMO layer.

In step S505, the UE is configured (e.g., via a DCI or a MAC CE) with the aggregated bandwidth or the number of CCs or MIMO layers for the data-SIM subscriber number.

In step S506, the UE determines whether the configured bandwidth or number of CCs or MIMO layers is able to support simultaneous Rx/Tx operation associated with the two separate subscriber numbers (denoted as "dual Rx/Tx" in FIG. 5A for brevity).

Subsequent to step S506, if the configured bandwidth or number of CCs or MIMO layers is able to support simultaneous Rx/Tx operation associated with the two separate subscriber numbers, the method proceeds to S509. Otherwise, if the configured bandwidth or number of CCs or MIMO layers is unable to support simultaneous Rx/Tx operation associated with the two separate subscriber numbers, the method proceed to step S507.

In step S507, the UE sends an Attach Request message, a Tracking Area Update Request message, or a Registration Request message including the first value to the mobile communication network.

In step S508, the UE is configured (e.g., via an RRC Reconfiguration message) with the aggregated bandwidth or the number of CCs or MIMO layers for the data-SIM subscriber number, and accordingly, updates the aggregated bandwidth or the number of CCs or MIMO layers that the UE operates with using the data-SIM subscriber number.

Returning to step S502, if the current configuration of RATs and band combinations in use for the two separate subscriber numbers supports simultaneous Rx/Tx operation associated with the two separate subscriber numbers, the method proceeds to step S509.

In step S509, the UE monitors the network supported configuration of RATs and band combinations in the UE's current location. The reason is that the network supported configuration of RATs and band combinations in the UE's current location may change as the UE may be moving.

In step S510, the UE determines whether the current configuration of RATs and band combinations in use for the two separate subscriber numbers is not supported by network in the UE's current location.

Subsequent to step S510, if the current configuration of RATs and band combinations in use for the two separate subscriber numbers is not supported by network in the UE's current location, the method proceeds to step S511. Otherwise, if the current configuration of RATs and band combinations in use for the two separate subscriber numbers is supported by network in the UE's current location, the method ends.

In step S511, the UE determines whether the UE has previously reported (either via a UE Assistance Information message or an Attach Request/Tracking Area Update Request/Registration Request message) a value representing reduced bandwidth or reduced number of CCs or MIMO layers for the data-SIM subscriber number to the mobile communication network.

Subsequent to step S511, if the UE has previously reported a value representing reduced bandwidth or reduced number of CCs or MIMO layers for the data-SIM subscriber number to the mobile communication network, the method proceeds to step S512. Otherwise, if the UE hasn't previously reported a value representing reduced bandwidth or reduced number of CCs or MIMO layers for the data-SIM subscriber number to the mobile communication network, the method ends.

In step S512, the UE restores the aggregated bandwidth and the number of CCs or MIMO layers to the non-reduced value, by reporting (either via a UE Assistance Information message or an Attach Request/Tracking Area Update Request/Registration Request message) the value in use prior to the previous report to the mobile communication network.

Returning to step S501, if the state of the data-SIM subscriber number is in the idle mode, the method proceeds to step S513.

In step S513, the UE determines whether the UE has previously reported a value representing reduced bandwidth or reduced number of CCs or MIMO layers for the data-SIM subscriber number via an Attach Request/Tracking Area Update Request/Registration Request message.

Subsequent to step S513, if the UE has previously reported a value representing reduced bandwidth or reduced number of CCs or MIMO layers for the data-SIM subscriber number via an Attach Request/Tracking Area Update Request/Registration Request message, the method proceeds to step S514. Otherwise, if the UE hasn't previously reported a value representing reduced bandwidth or reduced number of CCs or MIMO layers for the data-SIM subscriber number via an Attach Request/Tracking Area Update Request/Registration Request message, the method ends.

In step S514, the UE restores the aggregated bandwidth and the number of CCs or MIMO layers to the non-reduced value, by reporting (e.g., via an Attach Request/Tracking Area Update Request/Registration Request message) the value in use prior to the previous report.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising: a single Radio Frequency (RF) device; and a controller, configured to determine whether a trigger condition for enabling simultaneous Reception (Rx) or Transmission (Tx) operation associated with two separate subscriber numbers is met, the simultaneous Rx or Tx operation comprising a connected mode of communication, and in response to the trigger condition being met, report a first value to a mobile communication network via the single RF device, so as to enable simultaneous Rx or Tx operation associated with the two separate subscriber numbers, representing wherein the first value represents a reduced aggregated bandwidth, a reduced number of Component Carriers (CCs), or a reduced number of Multiple-Input-Multiple-Output (MIMO) layers for one of the two separate subscriber numbers to a mobile communication network via the single RF device, so as to enable simultaneous Rx or Tx operation associated with the two separate subscriber numbers, wherein the first value is less than a second value representing a maximum aggregated bandwidth, a maximum number of CCs, or a maximum number of MIMO layers supported by the UE's capability.

2. The UE as claimed in claim 1, wherein the trigger condition comprises: the UE is using the one of the two separate subscriber numbers to operate in a connected mode of communication with the mobile communication network; and current configuration of Radio Access Technologies (RATS) and band combinations in use for the two separate subscriber numbers does not support simultaneous Rx or Tx operation associated with the two separate subscriber numbers.

3. The UE as claimed in claim 1, wherein the one of the two separate subscriber numbers is configured for use of data services.

4. The UE as claimed in claim 1, wherein the first value is reported in a UE Assistance Information message.

5. The UE as claimed in claim 4, wherein the UE Assistance Information message is a Radio Resource Control (RRC) message, and the first value is reported without interrupting any ongoing data session of the UE.

6. The UE as claimed in claim 4, wherein, after reporting the first value, the controller further receives a Downlink Control Information (DCI) comprising an indication to reduce an aggregated bandwidth or a number of MIMO layers, or a Media Access Control (MAC) Control Element (CE) comprising an indication to reduce a number of CCs, and reduces the aggregated bandwidth or the number of CCs or MIMO layers for the one of the two separate subscriber numbers according to the indication.

7. The UE as claimed in claim 1, wherein the first value is reported in an Attach Request message, a Tracking Area Update Request message, or a Registration Request message.

8. The UE as claimed in claim 7, wherein the controller further configures the UE to use the one of the two separate subscriber numbers to switch from the connected mode to an idle mode of communication with the mobile communication network prior to reporting the first value, receives configuration of reducing an aggregated bandwidth or a number of CCs or MIMO layers from the mobile communication network after reporting the first value, and reduces the aggregated bandwidth or the number of CCs or MIMO layers for the one of the two separate subscriber numbers according to the received configuration.

9. The UE as claimed in claim 7, wherein, after reporting the first value, the controller is further configured to determine whether the UE is using the one of the two separate subscriber numbers to operate in an idle mode of communication with the mobile communication network, and in response to the UE using the one of the two separate subscriber numbers to operate in the idle mode, reports a third value representing an aggregated bandwidth or a number of CCs or MIMO layers that the UE operated with before reporting the first value.

10. The UE as claimed in claim 1, wherein, after reporting the first value, the controller further monitors whether current configuration of RATs and band combinations in use for the two separate subscriber numbers is supported by network in the UE's current location, and in response to the current configuration of RATs and band combinations in use for the two separate subscriber numbers not being supported by network in the UE's current location, reports a third value representing an aggregated bandwidth or a number of CCs or MIMO layers that the UE operated with before reporting the first value.

11. A method, comprising: determining, by a UE, whether a trigger condition for enabling simultaneous Reception (Rx) or Transmission (Tx) operation associated with two separate subscriber numbers is met; and in response to the trigger condition being met, reporting, by the UE, a first value to a mobile communication network via a single Radio Frequency (RF) device single RF device, so as to enable simultaneous Rx or Tx operation associated with the two separate subscriber numbers, representing wherein the first value represents a reduced aggregated bandwidth, a reduced number of Component Carriers (CCs), or a reduced number of Multiple-Input-Multiple-Output (MIMO) layers for one of the two separate subscriber numbers to a mobile communication network, so as to enable simultaneous Rx or Tx operation associated with the two separate subscriber numbers, the simultaneous Rx or Tx operation comprising a connected mode of communication, wherein the first value is less than a second value representing a maximum aggregated bandwidth, a maximum number of CCs, or a maximum number of MIMO layers supported by the UE's capability.

12. The method as claimed in claim 11, wherein the trigger condition comprises: the UE is using the one of the two separate subscriber numbers to operate in a connected mode of communication with the mobile communication network; and current configuration of Radio Access Technologies (RATS) and band combinations in use for the two separate subscriber numbers does not support simultaneous Rx or Tx operation associated with the two separate subscriber numbers.

13. The method as claimed in claim 11, wherein the one of the two separate subscriber numbers is configured for use of data services.

14. The method as claimed in claim 11, wherein the first value is reported in a UE Assistance Information message.

15. The method as claimed in claim 14, wherein the UE Assistance Information message is a Radio Resource Control (RRC) message, and the first value is reported without interrupting any ongoing data session of the UE.

16. The method as claimed in claim 14, further comprising:

after reporting the first value, receiving a Downlink Control Information (DCI) comprising an indication to reduce an aggregated bandwidth or a number of MIMO layers, or a Media Access Control (MAC) Control Element (CE) comprising an indication to reduce a number of CCs; and reducing the aggregated bandwidth or the number of CCs or MIMO layers for the one of the two separate subscriber numbers according to the indication.

17. The method as claimed in claim 11, wherein the first value is reported in an Attach Request message, a Tracking Area Update Request message, or a Registration Request message.

18. The method as claimed in claim 17, further comprising: configuring the UE to use the one of the two separate subscriber numbers to switch from the connected mode to an idle mode of communication with the mobile communication network prior to reporting the first value; receiving configuration of reducing an aggregated bandwidth or a number of CCs or MIMO layers from the mobile communication network after reporting the first value; and reducing the aggregated bandwidth or the number of CCs or MIMO layers for the one of the two separate subscriber numbers according to the received configuration.

19. The method as claimed in claim 11, further comprising: after reporting the first value, determining whether the UE is using the one of the two separate subscriber numbers to operate in an idle mode of communication with the mobile communication network; and in response to the UE using the one of the two separate subscriber numbers to operate in the idle mode, reporting a third value representing an aggregated bandwidth or a number of CCs or MIMO layers that the UE operated with before reporting the first value.

20. The method as claimed in claim 11, further comprising: after reporting the first value, monitoring whether current configuration of RATs and band combinations in use for the two separate subscriber numbers is supported by network in the UE's current location; and in response to the current configuration of RATs and band combinations in use for the two separate subscriber numbers not being supported by network in the UE's current location, reporting a third value representing an aggregated bandwidth or a number of CCs or MIMO layers that the UE operated with before reporting the first value.

* * * * *